United States Patent
Barfuss et al.

(10) Patent No.: US 10,314,111 B2
(45) Date of Patent: Jun. 4, 2019

(54) LIQUID RESISTANT HEATING ELEMENT

(71) Applicant: GENTHERM CANADA LTD., Windsor (CA)

(72) Inventors: Jack Barfuss, Windsor (CA); Syed Rafat Iqbal, Windsor (CA); Zoran Panic, Windsor (CA); Ricardo Edmundo Flores Gonzalez, Acuña Coahuila (MX); Pedro Antunez, Acuña Coahuila (MX); Wayne Swoyer Kauffman, III, Oak Park, MI (US)

(73) Assignee: GENTHERM GMBH, Odelzhausen (DE)

(*) Notice: Subject to any disclaimer, the term of this patent is extended or adjusted under 35 U.S.C. 154(b) by 421 days.

(21) Appl. No.: 14/265,610

(22) Filed: Apr. 30, 2014

(65) Prior Publication Data

US 2014/0326708 A1 Nov. 6, 2014

Related U.S. Application Data

(60) Provisional application No. 61/946,149, filed on Feb. 28, 2014, provisional application No. 61/818,597, filed on May 2, 2013.

(51) Int. Cl.
*H05B 3/04* (2006.01)
*B60N 2/56* (2006.01)
(Continued)

(52) U.S. Cl.
CPC .............. *H05B 3/04* (2013.01); *B60N 2/5685* (2013.01); *B62D 1/065* (2013.01); *H05B 3/565* (2013.01)

(58) Field of Classification Search
CPC .......... B62D 1/06; B60N 2/5685; H05B 3/04; H01B 13/22
(Continued)

(56) References Cited

U.S. PATENT DOCUMENTS 1,940,917 A * 12/1933 Okazaki ............... H01B 7/1895
174/113 C
2,296,227 A * 9/1942 Varga ....................... H01R 4/22
174/84 S
(Continued)

FOREIGN PATENT DOCUMENTS

CN 1049221 2/1991
CN 101242757 8/2008
(Continued)

OTHER PUBLICATIONS

International Search Report and Written Opinion, PCT/IB2014/001747, dated Dec. 5, 2014.
(Continued)

*Primary Examiner* — Jimmy Chou
(74) *Attorney, Agent, or Firm* — The Dobrusin Law Firm, P.C.

(57) ABSTRACT

An improved heating element, comprising: (a) an electrically insulated resistive heating wire; (b) a flexible substrate that supports the electrically insulated resistive wire: (c) one or more electrical connection for an operational component of the heating element, the electrical connection including at least two wires that are joined together; (d) a spacer controlling spacing between the at least two wires approaching the electrical connection; wherein at least a portion of the electrical connection including the spacer is encapsulated in a shrunken heat shrinkable sheath that includes at least one mass of hot melt adhesive within the sheath so that the electrical connection is insulated from fluid penetration.

14 Claims, 4 Drawing Sheets

(51) Int. Cl.
  *B62D 1/06* (2006.01)
  *H05B 3/56* (2006.01)

(58) Field of Classification Search
  USPC ....... 219/202, 204, 260, 264, 481; 174/77 R, 174/87, 76, 93; 524/270
  See application file for complete search history.

(56) References Cited

U.S. PATENT DOCUMENTS

| | | | | |
|---|---|---|---|---|
| 2,403,803 | A * | 7/1946 | Kearsley | H05B 3/342 219/212 |
| 2,424,438 | A * | 7/1947 | Downie | H05B 3/342 200/186 |
| 2,792,444 | A * | 5/1957 | Bergan | H01R 4/22 174/138 F |
| 2,906,810 | A * | 9/1959 | D Ascoli | H02G 15/04 174/76 |
| 2,937,228 | A * | 5/1960 | Robinson | H02G 15/085 174/88 C |
| 3,287,684 | A | 2/1964 | Armbruster | |
| 3,243,211 | A * | 3/1966 | Wetmore | B29C 61/0616 138/178 |
| 3,448,246 | A | 10/1967 | Armbruster | |
| 3,523,607 | A * | 8/1970 | Thompson | B65D 81/3266 174/76 |
| 3,538,240 | A * | 11/1970 | Sherlock | H01R 4/01 174/88 R |
| 3,585,275 | A * | 6/1971 | Gillemot | H02G 15/043 174/135 |
| 3,708,611 | A * | 1/1973 | Dinger | B29C 61/0616 174/84 C |
| 3,744,128 | A * | 7/1973 | Fisher | H01R 13/6599 174/75 C |
| 3,777,046 | A * | 12/1973 | Schiavone | H02G 7/125 174/146 |
| 3,839,595 | A * | 10/1974 | Yonkers | H01R 4/2495 174/84 C |
| 3,877,788 | A | 4/1975 | Spargue et al. | |
| 3,879,575 | A * | 4/1975 | Dobbin | G02B 6/4447 174/23 C |
| 3,892,946 | A | 7/1975 | Rimmi | |
| 3,919,460 | A * | 11/1975 | Neail | H02G 15/003 174/76 |
| 3,934,076 | A * | 1/1976 | Smith | H02G 15/06 174/138 F |
| 3,985,951 | A * | 10/1976 | Harris | H01B 7/2855 138/141 |
| 4,032,752 | A | 6/1977 | Ohmura et al. | |
| 4,039,742 | A * | 8/1977 | Smith | H01R 4/22 174/76 |
| 4,044,221 | A | 8/1977 | Kuhn | |
| 4,053,704 | A * | 10/1977 | Smith | H02G 15/06 174/138 F |
| 4,065,034 | A * | 12/1977 | Callan | B05C 3/132 219/230 |
| 4,149,066 | A | 4/1979 | Niibe | |
| 4,245,149 | A | 1/1981 | Fairlie | |
| 4,252,990 | A * | 2/1981 | Sado | H01C 1/02 174/541 |
| 4,292,099 | A * | 9/1981 | Dinger | H01R 4/22 156/158 |
| 4,314,092 | A * | 2/1982 | Fleming | H02G 1/14 156/49 |
| 4,388,523 | A * | 6/1983 | Keep, Jr. | H05B 3/06 174/77 R |
| 4,431,469 | A * | 2/1984 | Falcomato | B29C 61/0616 138/113 |
| 4,436,986 | A | 3/1984 | Carlson | |
| 4,438,294 | A * | 3/1984 | Meltsch | H02G 15/013 174/88 R |
| 4,438,995 | A * | 3/1984 | Fisher | F16L 19/005 174/87 |
| 4,460,728 | A * | 7/1984 | Schmidt, Jr. | C09J 123/08 524/271 |
| 4,504,699 | A * | 3/1985 | Dones | B29C 61/0608 174/76 |
| 4,523,085 | A | 6/1985 | Grise | |
| 4,595,724 | A * | 6/1986 | Koblitz | C08K 3/22 174/74 A |
| 4,614,398 | A * | 9/1986 | Wright | H01R 13/6592 439/579 |
| 4,626,664 | A | 12/1986 | Grise | |
| 4,656,339 | A | 4/1987 | Grise | |
| 4,661,689 | A | 4/1987 | Harrison | |
| 4,719,335 | A | 1/1988 | Batliwalla et al. | |
| 4,721,832 | A * | 1/1988 | Toy | H01R 4/70 156/49 |
| 4,725,717 | A | 2/1988 | Harrison | |
| 4,752,672 | A | 6/1988 | Grise | |
| 4,761,541 | A | 8/1988 | Batliwalla et al. | |
| 4,777,351 | A | 10/1988 | Batliwalla et al. | |
| 4,839,473 | A * | 6/1989 | Fox | H02G 15/18 174/138 F |
| 4,868,898 | A | 9/1989 | Seto | |
| 4,879,807 | A * | 11/1989 | Roucaute | H01R 4/72 174/88 C |
| 4,907,623 | A * | 3/1990 | Kinney | H01R 4/72 138/103 |
| 5,015,824 | A | 5/1991 | Monter et al. | |
| 5,081,339 | A | 1/1992 | Stine | |
| 5,082,994 | A * | 1/1992 | Braunig | H01R 4/22 174/356 |
| 5,107,077 | A * | 4/1992 | Fox | H02G 15/18 174/138 F |
| 5,111,025 | A | 5/1992 | Barma et al. | |
| 5,197,595 | A | 3/1993 | Coultas | |
| 5,198,639 | A | 3/1993 | Smuckler | |
| 5,221,815 | A * | 6/1993 | Bostock | H01R 4/723 174/84 C |
| 5,281,763 | A * | 1/1994 | Hey | H01B 7/285 174/22 R |
| 5,298,300 | A * | 3/1994 | Hosoi | B29C 61/0616 174/DIG. 8 |
| 5,335,381 | A | 8/1994 | Chang | |
| 5,371,323 | A * | 12/1994 | Schneider | H01R 4/646 174/138 F |
| 5,403,977 | A * | 4/1995 | Steptoe | H01R 4/70 156/49 |
| 5,405,665 | A * | 4/1995 | Shukushima | B32B 1/08 428/317.3 |
| 5,422,438 | A * | 6/1995 | Lamome | H01R 4/203 174/76 |
| 5,432,322 | A | 7/1995 | Ingram et al. | |
| 5,451,747 | A | 9/1995 | Sullivan et al. | |
| 5,477,033 | A | 12/1995 | Bergholtz | |
| 5,534,575 | A * | 7/1996 | Foster | C08G 69/40 428/355 R |
| 5,543,601 | A | 8/1996 | Bartrug et al. | |
| 5,565,121 | A | 10/1996 | Forslund | |
| 5,625,167 | A * | 4/1997 | Van Noten | H02G 15/043 174/138 F |
| 5,641,943 | A * | 6/1997 | Sawamura | H01R 4/22 174/74 A |
| 5,643,480 | A | 7/1997 | Gustavsson et al. | |
| 5,702,565 | A | 12/1997 | Wu et al. | |
| 5,749,756 | A * | 5/1998 | Vockroth | H01R 4/203 174/84 C |
| 5,753,747 | A * | 5/1998 | Oien | C08G 18/12 156/330.9 |
| 5,800,483 | A | 9/1998 | Vought | |
| 5,817,978 | A * | 10/1998 | Hermant | H01R 9/0503 174/75 C |
| 5,824,996 | A | 10/1998 | Kochman et al. | |
| 5,847,320 | A * | 12/1998 | Fisher | H01R 4/12 174/87 |
| 5,875,547 | A * | 3/1999 | Larsson | H01R 4/70 156/49 |
| 5,897,162 | A | 4/1999 | Humes et al. | |
| 5,904,874 | A | 5/1999 | Winter | |

(56) References Cited

U.S. PATENT DOCUMENTS

| | | | |
|---|---|---|---|
| 5,922,992 A * | 7/1999 | Kinney | H01R 4/72 174/74 A |
| 5,948,297 A | 9/1999 | Haubner et al. | |
| 5,948,303 A * | 9/1999 | Larson | G05D 23/1905 126/205 |
| 5,961,869 A | 10/1999 | Irgens | |
| 6,054,690 A | 4/2000 | Petit et al. | |
| 6,057,530 A | 5/2000 | Gurevich | |
| 6,064,037 A | 5/2000 | Weiss et al. | |
| 6,107,573 A * | 8/2000 | Uchiyama | H01R 4/22 174/75 R |
| 6,111,234 A | 8/2000 | Batliwalla et al. | |
| 6,147,332 A | 11/2000 | Holmberg et al. | |
| 6,150,642 A | 11/2000 | Weiss et al. | |
| 6,156,976 A * | 12/2000 | Kawamura | H01R 4/22 174/76 |
| 6,164,719 A | 12/2000 | Rauh | |
| 6,172,344 B1 | 1/2001 | Gordon et al. | |
| 6,189,487 B1 | 2/2001 | Owen et al. | |
| 6,194,692 B1 | 2/2001 | Oberle | |
| 6,215,111 B1 | 4/2001 | Rock et al. | |
| 6,220,659 B1 | 4/2001 | McDowell et al. | |
| 6,225,562 B1 * | 5/2001 | Fujishita | B60R 16/0222 174/152 G |
| 6,229,123 B1 | 5/2001 | Kochman et al. | |
| RE37,340 E * | 8/2001 | King, Jr. | H01R 4/22 174/87 |
| 6,278,090 B1 | 8/2001 | Fristedt et al. | |
| 6,294,737 B1 * | 9/2001 | Chestney | H01R 4/70 174/74 A |
| 6,294,758 B1 | 9/2001 | Masao et al. | |
| 6,333,463 B1 * | 12/2001 | Bukovnik | H02G 15/003 174/77 R |
| 6,369,369 B2 | 4/2002 | Kochman et al. | |
| 6,415,501 B1 | 7/2002 | Schlesselman | |
| 6,439,658 B1 | 8/2002 | Ganz et al. | |
| 6,452,138 B1 | 9/2002 | Kochman et al. | |
| 6,455,823 B1 | 9/2002 | Bulgajewski et al. | |
| 6,495,809 B2 | 12/2002 | Bulgajewski et al. | |
| 6,501,055 B2 | 12/2002 | Rock et al. | |
| 6,512,203 B2 | 1/2003 | Jones et al. | |
| 6,559,422 B2 | 5/2003 | Burt | |
| 6,568,690 B1 * | 5/2003 | Tognali | H01R 4/72 174/74 R |
| 6,568,945 B2 * | 5/2003 | Whybrow | H01R 13/65802 439/86 |
| 6,619,736 B2 | 9/2003 | Stowe et al. | |
| 6,627,818 B2 * | 9/2003 | Kamel | H01R 4/22 174/77 R |
| 6,629,724 B2 | 10/2003 | Ekern et al. | |
| 6,658,735 B2 * | 12/2003 | Ito | H01R 4/183 174/84 C |
| 6,664,512 B2 | 12/2003 | Horey et al. | |
| 6,664,518 B2 | 12/2003 | Fristedt | |
| 6,666,732 B1 * | 12/2003 | Endacott | H01R 4/187 439/730 |
| 6,676,207 B2 | 1/2004 | Rauh et al. | |
| 6,677,529 B1 * | 1/2004 | Endacott | H01R 4/187 174/84 C |
| 6,686,562 B1 | 2/2004 | Weiss et al. | |
| 6,710,303 B1 | 3/2004 | Lorenzen | |
| 6,713,733 B2 | 3/2004 | Kochman et al. | |
| 6,730,847 B1 * | 5/2004 | Fitzgerald | H01R 4/22 174/74 R |
| 6,838,647 B2 | 1/2005 | Nagele | |
| 6,849,358 B2 * | 2/2005 | O'Connell | H01M 2/0277 429/161 |
| 6,869,140 B2 | 3/2005 | White et al. | |
| 6,872,882 B2 | 3/2005 | Fritz | |
| 6,884,965 B2 | 4/2005 | Nelson et al. | |
| 6,892,807 B2 | 5/2005 | Fristedt et al. | |
| 6,906,293 B2 | 6/2005 | Schmiz et al. | |
| 6,973,721 B2 * | 12/2005 | Charron | H01R 9/032 174/73.1 |
| 6,976,734 B2 | 12/2005 | Stoewe | |
| 6,988,770 B2 * | 1/2006 | Witchie | A47C 7/744 297/180.12 |
| 7,033,348 B2 * | 4/2006 | Alfano | A61B 17/00491 128/898 |
| 7,036,283 B2 | 5/2006 | Halas | |
| 7,109,423 B1 * | 9/2006 | Bukovnik | H01R 4/22 174/77 R |
| 7,180,040 B2 * | 2/2007 | Jones | H05B 3/56 174/84 C |
| 7,196,268 B2 * | 3/2007 | Vaughn | H01R 4/72 174/76 |
| 7,256,348 B1 * | 8/2007 | Endacott | H01R 4/183 174/84 C |
| 7,275,960 B2 * | 10/2007 | Fukushima | H01R 9/0524 439/607.15 |
| 7,301,441 B2 | 11/2007 | Inada et al. | |
| 7,378,593 B2 * | 5/2008 | Bukovnik | H01R 4/22 174/77 R |
| 7,534,138 B1 * | 5/2009 | Gump | H01R 9/032 439/564 |
| 7,560,670 B2 | 7/2009 | Lorenzen et al. | |
| 7,572,979 B2 * | 8/2009 | Otsuki | H01R 13/5213 174/84 R |
| 7,587,901 B2 | 9/2009 | Petrovski | |
| 7,732,736 B2 * | 6/2010 | MacLean | G05D 23/27536 219/221 |
| 7,788,803 B2 * | 9/2010 | King, Jr. | H01R 4/22 29/874 |
| 7,834,268 B2 * | 11/2010 | Ootsuki | H01R 4/22 174/74 A |
| 7,838,804 B2 * | 11/2010 | Krobok | H05B 3/34 165/158 |
| 8,323,058 B2 * | 12/2012 | Flaherty | H01R 13/6277 439/680 |
| 8,350,155 B2 * | 1/2013 | Kobayashi | H01R 4/186 174/84 R |
| 8,471,148 B2 * | 6/2013 | Steinich | H01B 7/282 174/72 C |
| 8,556,525 B2 * | 10/2013 | Homma | G02B 6/2558 385/99 |
| 8,568,163 B2 * | 10/2013 | Burris | H01R 13/6277 439/578 |
| 8,586,866 B2 * | 11/2013 | D'Angelo, III | E21B 17/003 174/74 R |
| 8,667,676 B2 * | 3/2014 | Sviben | H01R 4/726 174/84 C |
| 8,702,127 B2 * | 4/2014 | No | B42D 1/04 281/21.1 |
| 9,017,110 B2 * | 4/2015 | Guillanton | H01R 9/0503 174/34 |
| 9,139,119 B2 | 9/2015 | Ohashi et al. | |
| 9,184,517 B1 * | 11/2015 | Endacott | H01R 4/183 |
| 9,191,997 B2 * | 11/2015 | Weiß | B60N 2/5685 |
| 9,302,602 B2 * | 4/2016 | Yoshida | B60N 2/5685 |
| 9,318,849 B2 * | 4/2016 | Kobayashi | H01R 13/5205 |
| 9,379,531 B2 * | 6/2016 | Boedec | H01R 4/021 |
| 2002/0170902 A1 * | 11/2002 | Check | B29C 65/02 219/217 |
| 2004/0035854 A1 * | 2/2004 | Cheng | H05B 3/56 219/549 |
| 2004/0074667 A1 * | 4/2004 | Endacott | H01R 4/187 174/84 R |
| 2004/0099428 A1 * | 5/2004 | Miyazaki | H01R 13/655 174/366 |
| 2004/0168315 A1 * | 9/2004 | Onuma | H01R 4/04 29/854 |
| 2005/0039941 A1 * | 2/2005 | Marroquin | H01R 13/655 174/78 |
| 2005/0085968 A1 * | 4/2005 | Panic | B60N 2/0244 701/36 |
| 2005/0095892 A1 * | 5/2005 | Fukuyama | H01R 11/12 439/287 |

(56) References Cited

U.S. PATENT DOCUMENTS

| | | | | |
|---|---|---|---|---|
| 2005/0103769 | A1* | 5/2005 | Marquis | A01K 87/085 |
| | | | | 219/204 |
| 2007/0007266 | A1* | 1/2007 | Sasaki | B62J 33/00 |
| | | | | 219/202 |
| 2007/0056946 | A1* | 3/2007 | Chen | B60N 2/5685 |
| | | | | 219/202 |
| 2007/0210074 | A1 | 9/2007 | Maurer et al. | |
| 2007/0251724 | A1* | 11/2007 | Kuo | H01R 13/5845 |
| | | | | 174/74 R |
| 2007/0278214 | A1* | 12/2007 | Weiss | H05B 3/342 |
| | | | | 219/545 |
| 2008/0290080 | A1* | 11/2008 | Weiss | H05B 1/0238 |
| | | | | 219/202 |
| 2008/0296939 | A1* | 12/2008 | Bajic | B60H 1/00285 |
| | | | | 297/180.1 |
| 2009/0032518 | A1* | 2/2009 | Ohashi | B60N 2/5685 |
| | | | | 219/202 |
| 2009/0095725 | A1* | 4/2009 | Ohashi | B60N 2/5685 |
| | | | | 219/202 |
| 2010/0000981 | A1* | 1/2010 | Diemer | H05B 3/146 |
| | | | | 219/202 |
| 2010/0035356 | A1 | 2/2010 | Shalyt et al. | |
| 2010/0038356 | A1 | 2/2010 | Fukuda et al. | |
| 2010/0038357 | A1 | 2/2010 | Fukuda et al. | |
| 2010/0089894 | A1* | 4/2010 | Richmond | H05B 3/34 |
| | | | | 219/202 |
| 2010/0146786 | A1* | 6/2010 | Sviben | H01R 4/726 |
| | | | | 29/869 |
| 2010/0326976 | A1 | 12/2010 | Nakajima et al. | |
| 2011/0155458 | A1* | 6/2011 | Kato | B60R 16/0215 |
| | | | | 174/74 R |
| 2011/0240751 | A1* | 10/2011 | Rauh | B64D 13/00 |
| | | | | 236/91 D |
| 2012/0080419 | A1* | 4/2012 | Bush | G02B 6/2558 |
| | | | | 219/385 |
| 2012/0091112 | A1* | 4/2012 | Wei | B60N 2/5685 |
| | | | | 219/202 |
| 2012/0228277 | A1* | 9/2012 | Abe | B60N 2/5685 |
| | | | | 219/202 |
| 2012/0228903 | A1* | 9/2012 | Abe | A47C 7/74 |
| | | | | 297/180.12 |
| 2013/0207422 | A1* | 8/2013 | Potton | B60N 2/5685 |
| | | | | 297/180.12 |
| 2013/0309903 | A1* | 11/2013 | Iio | H01R 13/5216 |
| | | | | 439/523 |

FOREIGN PATENT DOCUMENTS

| | | |
|---|---|---|
| DE | 3513909 | 10/1986 |
| DE | 202004004182 U | 7/2005 |
| EP | 1571887 B1 | 5/2007 |
| EP | 1929901 B1 | 10/2012 |
| GB | 2010650 A | 6/1979 |
| JP | 57134655 A | 8/1982 |
| JP | H04-506822 | 11/1992 |
| JP | 11-24493 A | 1/1999 |
| JP | 2007-227384 | 9/2007 |
| KR | 10-0152970 | 10/1998 |
| KR | 10-2008-0038164 | 5/2008 |
| WO | 9100896 A1 | 1/1991 |
| WO | 2007/102500 | 9/2007 |

OTHER PUBLICATIONS

The State Intellectual Property Office of the People's Republic of China dated Jul. 4, 2016 for Application No. 201480024844.8.
Japanese Office Action for Application No. 2016-511142 dated Nov. 11, 2016.
Korean Office Action for Application No. 10-2015-7030838 dated Sep. 23, 2016.
Korean Office Action for Application No. 10-2015-7030838 dated Apr. 4, 2017.
Chinese Office Action for Application No. 201480024844.8 dated Feb. 7, 2017.
Chinese Office Action for Application No. 201480024844.8 dated Sep. 15, 2017.
Chinese Office Action from the State Intellectual Property Office for Application No. 201480024844.8 dated Mar. 12, 2018.

* cited by examiner

LIQUID RESISTANT HEATING ELEMENT

TECHNICAL FIELD

The present invention pertains generally to heating elements and more specifically to seat heating elements that exhibit liquid resistance.

BACKGROUND

For many commercially available heating elements, typically there is at least one resistive lay wire carried on a flexible substrate that is connected with a power source. Upon application of power, heat evolves. Such heating elements find particular suitability in automotive applications as seat heaters or steering wheel heaters.

For many automotive applications it is important that such heaters be resistant to liquids. Further heaters may be used in marine applications such as boats and may be subjected to sea spray, moisture from waves, wet bathing suits, wet towels, the like, or a combination thereof. This is important for helping to avoid potential corrosion. It is also important for helping to avoid short circuits or other heater malfunctions.

Notwithstanding efforts to date, there remains a need for heating elements, and particularly seat and/or steering wheel heaters that exhibit a relatively high degree of liquid resistance. One example of an attempt to create a heater that is fluid resistant may be found in U.S. Pat. No. 8,492,680 the teachings of which are expressly incorporated by reference herein for all purposes.

SUMMARY

The teachings herein meet the above needs by providing an improved heating element construction that renders the element liquid resistant. In one aspect, the improved heating element (e.g., for an automotive and/or marine seat heater) may include a resistive heating wire; a flexible substrate that supports the resistive wire; an electrical connection for an operational component of the heating element, the electrical connection including at least two wires that are joined together, and a spacer controlling spacing between the wires approaching the connection; and at least a portion of the heating element is encapsulated in a shrunken heat shrinkable sheath (i.e., having a recovered diameter) with at least one mass of hot melt adhesive within the sheath. The at least two wires may be adhesively secured to the flexible substrate with a patch layer, which optionally may be liquid resistant.

The teachings herein provide: an improved heating element, comprising: (a) an electrically insulated resistive heating wire; (b) a flexible substrate that supports the electrically insulated resistive wire; (c) one or more electrical connection for an operational component of the heating element, the electrical connection including at least two wires that are joined together; (d) a spacer controlling spacing between the at least two wires approaching the electrical connection; wherein at least a portion of the electrical connection including the spacer is encapsulated in a shrunken heat shrinkable sheath that includes at least one mass of hot melt adhesive within the sheath so that the electrical connection is insulated from fluid penetration. The teachings herein provide A heating element comprising: (a) one or more heating wires, (b) one or more temperature regulators; (c) one or more thermostats; (d) one or more power wires, one or more sensing wires, or both; and wherein the one or more heating wires; one or more temperature regulators; the one or more thermostats; and one or more power wires, one or more sensing wires, or both each include one or more exposed and non-electrically insulated heater connections; (e) one or more spacers located between two or more of the one or more exposed and non-electrically insulated heater connections; (f) one or more shrinking waterproof tubes or shrinking tubes including any other insulating entities or materials applied over each of the one or more exposed and non-electrically insulated heater connections and the one or more spacers so that an electrically insulated heating connection is formed between two or more of the one or more heating wires, one or more temperature regulators, and one or more thermostats and/or one or more power wires, one or more sensing wires, or a combination thereof; and wherein when the one or more exposed and non-electrically insulated heating connections create a fully and complete electrical circuit is formed so that the heating element are insulated with respect to the surrounding elements and environment.

Methods of making the heating element may include placing the heat shrinkable sheath with the mass of hot melt adhesive within the sheath on an electrical connection of at least two wires and heating the heat shrinkable sheath with the mass of hot melt adhesive so that the sheath shrinks around the electrical connection and causes the hot melt adhesive to flow around (and optionally at least partially infiltrate the electrical connection) and encapsulate the electrical connection, wherein upon cooling to room temperature the electrical connection is liquid resistant.

The present teachings include a method providing a method of making a heating element of the teachings herein, comprising attaching the spacer to one or more wires and positioning the spacer in the proper location, forming an electrical connection between the wires, placing the heat shrinkable sheath with the mass of hot melt adhesive within the sheath on an electrical connection of at least two wires and heating the heat shrinkable sheath with the mass of hot melt adhesive so that the sheath shrinks around the electrical connection and causes the hot melt adhesive to flow around (and optionally at least partially infiltrate the electrical connection) and encapsulate the electrical connection, wherein upon cooling to room temperature the electrical connection is liquid resistant. The entire construction may be encapsulated within a water impermeable barrier. For example, a liquid impermeable coating or other layer may be deposited or otherwise applied over the construction.

DETAILED DESCRIPTION

The explanations and illustrations presented herein are intended to acquaint others skilled in the art with the invention, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present teachings claim the benefit of U.S. Patent Application Ser. Nos. 61/818,597, filed on May 2, 2013 and 61/946,149, filed on Feb. 28, 2014 both of which are expressly incorporated by reference herein in their entirety for all purposes. As used herein, "liquid resistant" refers to an ability of a construction to resist entry of a liquid within components of the construction as manifested by detectable current leakage. For example, a liquid resistant material in accordance with the present teachings will exhibit no detectable current leakage when submerged in water and subjected to a voltage of about 13.5 volts and a current of about 2.9 to 3 amperes (A) over a period of at least 48 hours.

The teachings herein contemplate an improved heating element, including an operational component such as a resistive heating wire; a flexible substrate that supports the resistive wire; an electrical connection for an operational component of the heating element, the electrical connection including at least two wires that are joined together; a spacer controlling spacing between the wires as the wires approach the connection; where the heating element is at least partially encapsulated in a shrunken heat shrinkable sheath with at least one mass of hot melt adhesive within the sheath. The two or more wires may extend into a sheath from the same side of the sheath. Preferably, the two or more wires may both extend into the same side of a sheath so that one end of the sheath is completely sealed. The wires of the operational components may be the at least two wires that are selected from the one or more electrically insulated resistive heating wires and one or more power source wires, one or more negative thermal coefficient terminals, one or more sensor wires, one or more thermostat terminals, one or more control wires, one or more thermostat terminals, one or more power wires, a negative temperature coefficient sensor, a signal wire, a thermostat wire, a signal wire, or any combination thereof, in one preferred aspect, the heating element is adapted for use as a heater for an automotive vehicle. Preferably, the heater may be placed in a seat, steering wheel, arm rest, door panel, floor, wall, head rest, neck rest, headliner, or a combination thereof. Accordingly it may include a flexible substrate that is adapted to overlie a seat cushion of a vehicle.

The one or more heating elements may function to generate heat upon an application of heat. The one or more heating elements may function to generate heat when substantially submerged in a fluid such as water. The one or more heating elements may be entirely submerged in a fluid and be resistant to current loss after being submerged for 6 hours or more 12 hours or more, preferably 24 hours or more, more preferably 48 hours or more, or even 100 hours or more without any current loss. The heating elements, the electrical connections between two or more wires, or both may be resistant to current loss as is discussed herein. For example, when the heating elements, the sheath covered electrical connections, or both are subjected to a liquid and an amount of current in the liquid is tested, the liquid may be free of any current for an extended duration as is discussed herein.

It is envisioned that there will be at least two wires that make up the heating element. The wires may form one or more electrical connections. One or more wires may function to generate heat and one or more wires may function to provide power. For example, electrical connections may exist between wires such as those selected from a resistive heating wire (e.g., a negative temperature coefficient wire, a positive temperature coefficient wire, a resistive wire, or a combination thereof) and a power wire (e.g., a harness wire), a negative thermal coefficient terminal and a sensor wire, a thermostat terminal and a control wire, a thermostat terminal and a power wire, a negative temperature coefficient sensor, between two harness wires, between two resistive heating wires, or any combination thereof. Preferably, the heating element includes one or more harness wires that are connected to one or more resistive heating wires and the resistive heating wires produce heat when power is applied through the harness wires.

The harness wires may function to provide power, signals, controls, or a combination thereof. The harness wires may control operation of the heating element. The harness wires may each be individually liquid resistant. Preferably, the harness wires along their lengths are resistant to liquid penetration so that no further liquid resistant material or application of liquid resistance is needed. The ends of the harness wires when prepared for forming a connection may create a location of ingress for liquids. The ends of the wires may be sealed using a sheath as taught herein. Preferably, the end of a harness wire and another wire such as a resistive heating wire may be sealed simultaneously by the sheath.

The resistive heating wires may function to generate heat upon an application of power. The electrical component wires may function to provide power to the instrumentation, electrical components, or both of the heating element so that upon an application of power the heating element is controlled. The resistive heating wires and/or electrical component wires may be resistant to liquid penetration along their length so that no further liquid resistant material or an application of liquid resistance is needed. The ends of the resistive heating wires and/or electrical component wires when prepared for forming a connection may create a location of ingress for liquids. The ends of the resistive heating wires and/or electrical component wires may be sealed using a sheath as taught herein.

The electrical components may be insulated, self-contained, water resistant or a combination thereof and include one or more wires that extend therefrom that are may or may not insulated, self-contained, water resistant, or a combination thereof. The electrical components may be a thermistor, a temperature sensor, or both. The electrical components may be connected to one or more harness wires via the sheath and one or more spacers may be located between the wires so that non-fluid resistant portions of one or more wires may be fully encapsulated within the sheath and protected from fluid penetration.

Preferably, spacing between the at least two wires that make up the connections of the heating element is controlled by one or more spacers. The one or more spacers function to create a distance between the wires, which allows an adhesive within the sheath to fully encapsulate the wires independently, to increase the liquid resistance of the heating element, reduce and/or eliminate voids of adhesive between the wires, or a combination thereof. The one or more spacers may be any size, shape, configuration, or a combination thereof where the one or more spacers create a gap between two or more adjacent wires. The spacer may be located along and/or on one or more of the wires, with a location preferably close enough to the electrical connection to permit a robust connection between the wires without compromising the connection. The location of the spacer may be dependent upon the gauge of the wire, with a preferable location that does not interfere with the connection. The spacer may be made of a nonconductive, dielectric material and is preferably flexible. The spacer material is preferably elastomeric and non-rigid. The spacer may comprise an insulating material, which may be the same material as insulating material on the one or more wires. The spacer may be heat flowable, expandable, an adhesive, made of the same material as the adhesive of the sheath, or a combination thereof. The spacer may function to assist the adhesive of the sheath in creating a liquid resistant connection of two or more wires.

The spacer may have one or more openings and/or cutouts to receive one or more wires. The one or more openings and/or cutouts may be generally cylindrical, generally hollow, generally able to surround at least a portion of a wire, or combination thereof. The one or more openings may partially and/or completely surround one or more wires to assist in forming a liquid resistant connection. The spacer preferably may be a generally cylindrical sleeve that surrounds at least a portion of one or more of the wires. Preferably the generally cylindrical sleeve has an inner diameter about equal to or even smaller than the outer diameter of the wire so the spacer, when installed, has a tight fit around the wire. Preferably, the spacer is allowed to slide along the one or more wires for proper positioning of the spacer within the sheath, the heating element, or both.

One or more sheaths may function to form one or more liquid resistant connections that protect one or more electrical connections between two or more wires. The one or more sheaths may include one or more open ends, one open end, one closed end, or a combination thereof. Preferably, the one or more sheaths include one open end for receiving one or more wires and one closed end for sealing the sheath. The sheath used to encapsulate the one or more electrical connections and the sheath may include one or more adhesive lined flexible heat shrink sleeving. The sheath thus may include an outer layer that includes an internal adhesive layer, such as a hot melt adhesive layer. The hot melt adhesive may be any adhesive that may form a flexible bond with rubber, plastic, metal, or a combination thereof. The hot melt adhesive may be a thermoplastic polymer that has a melting point or a softening point that is above the heating element operational temperature in vicinity of any encapsulated connections. An example of a material for the hot melt adhesive is ethylene vinyl acetate. The hot melt adhesive may be characterized as having a melting or softening temperature in excess of about 65° C. (e.g., in excess of about 75° C. or even in excess of about 85° C.). The hot melt adhesive may be characterized as having a melting or softening temperature below the temperature to which the sheath is subjected for heat shrinking. The hot melt adhesive may sufficiently soften, melt, flow, or a combination thereof so that voids are prevented, any voids that are present are filled, the sheath is free of open spaces that allow an ingress of fluid, or a combination thereof. The sheath may include a maximum use temperature (i.e., a temperature where the sheath and/or hot melt adhesive is re-softened so that the sheath begins to shrink a second time and/or the hot melt softens and/or begins to flow). The maximum use temperature may be about 100° C. or more, preferably about 105° C. or more, more preferably about 110° C. or more, or most preferably about 120° C. or more. The glass transition temperature of the spacer is preferably a temperature that allows the spacer to maintain adequate spacing of the wires even when heat is applied to melt the adhesive. Some deformation due to heat is possible, though it is preferable that the glass transition temperature of the spacer is higher than the melting temperature of the hot melt adhesive. Preferably the spacer does not melt or deform due to exposure to the hot melt adhesive.

The sheath may be made from a material selected from a polyolefin, a neoprene, a polytetrafluoroethylene, or any combination thereof. The outer layer has an expanded diameter that may be such that upon application of heat and thereafter upon cooling the inner diameter is reduced (i.e., recovered diameter) by at least about one half or even at least about one third its initial inner diameter. The sheath may have an initial wall thickness (before subjecting to heating for heat shrinking) that is about 1.5 or even about two times its final wall thickness (i.e., after being subjected to heat shrinking). The outer layer of the sheath may shrink a sufficient amount that the sheath may remove any voids, open spaces, or both so that liquids cannot ingress into the sheath. The outer layer of the sheath may shrink a sufficient amount so that the softened adhesive fills any voids and/or open spaces.

The expanded internal diameter of the sheath may be any diameter so that two or more wires separated by one or more spacers may be inserted into the sheath, two or more wire ends may be inserted into sheath and electrically connected, for a water resistant connection, form a connection that does not leak current, or a combination thereof. The expanded internal diameter of the sheath may be about 3 mm or more, 5 mm or more, 10 mm or more, 20 mm or more, or even 40 mm or more. The recovered internal diameter may be about 0.5 mm or more, about 1.0 mm or more, about 1.5 mm or more, about 2.0 mm or more, about 5.0 mm or more. The sheath may have a ratio of an expanded internal diameter to a recovered internal diameter. The ratio of expanded internal diameter to recovered internal diameter may be about 1:2 or less, about 1:2.5 or less, about 1:3 or less, about 1:4 or less, or even about 1:5 or less (e.g., shrinks to ⅕ original size). The tube may have a length to shrink ratio. The shorter the tube the more the tube may shrink (i.e., the shorter the tube the more shrinking may occur to create a fluid resistant connection of two or more wires). The diameter of the tube may shrink by 0.1 or more mm for every inch of tubing. The length to shrink ratio may be about 10:1 or more, about 5:1 or more, about 10:3 or more, or even about 5:2 or more.

An example of an adhesive lined flexible heat shrink sleeving useful in accordance with the present teachings is available commercially from 3M™ sold as adhesive-lined translucent, semi-rigid polyolefin tubing. The teachings herein contemplate use of such sleeving or other sleeving having substantially similar material properties.

The length of the sleeving employed will be sufficient to cover the electrical connection. Preferably it will be at least 1.2, 1.5 or even at least twice or three times the length of the exposed wire for the electrical connection. For example, for an exposed wire length of about one centimeter (cm) in an electrical connection, the sleeve desirably will be about 2 to about 3 cm in length. The sleeve will be located so that the electrical connection is at an intermediate location within the sleeve. In this manner, roughly the same amount or length of the internal hot melt adhesive will extend along the length in roughly equal opposing directions.

Desirably the wires employed will be insulated substantially along their length, although they will be exposed (e.g., at their ends) at the electrical connection where they are joined together. The wires may be independently waterproof, water repellant, water impermeable, or a combination thereof other than the exposed end of the wires. Each wire may have one or more exposed ends. For example, a harness wire may have a first connection with a resistive heating wire and a second connection with a terminal and both of the connections may be formed with the teachings herein so that the connections are waterproof. The wires may be covered with a covering. The covering may function to protect the wires located within the covering. The covering may be made of the same material as the substrate. The covering may be a patch. The covering may be fluid proof (i.e., water-proof), fluid repellant (i.e., water repellant), non-water absorbing, non-water permeable, woven, non-woven, cotton based, polymer based, a polymeric, or a combination thereof. The covering may be insulating, flexible, or both. The wires (e.g., harness wires, resistive heating wires, sensor wires, or a combination thereof) may each individually include a covering, may all be located within a covering, or both.

An insulated resistive heating wire may have a resistance of about 2,000 Ω/m or more, about 5,000 Ω/m or more, about 7,000 Ω/m or more, or about 9,000 Ω/m or more. The insulating resistive heating wire may produce a temperature of about 80° C. or more, about 90° C. or more, or about 100° C. or more when power is applied. The insulating wire may produce a temperature of about 150° C. or less, about 140° C. or less, or about 130° C. or less when powered is applied. An example of an insulated resistive heating wire is available from Totoku sold as PVC heater wires and heater element. The wires are connected to a substrate forming a pattern so that a heating element is formed. The wires may be sewn into, glued on, stapled on, sewn on, or a combination thereof the substrate.

The wires when connected to the substrate may be fluid resistant, fluid impermeable, encapsulated, or a combination thereof except for the ends of the wires. As discussed herein the ends of the wires may be placed in the shrink sleeving along with a connecting wire and encapsulated within the shrink sleeving so that both wires are electrically connected and protected from fluid penetration. Additionally, this process may be repeated for the one or more temperature sensor connections, one or more thermostat connections, or a combination of both so that the connections and the temperature sensor, the thermostat, or both are sealed and fluid resistant. Sealing the one or more connections throughout the heating element may form a heater that is resistant to current leakage when subjected to a fluid. The heating element and associated connections may be resistant to current leakage when subjected to a fluid without any additional encapsulants, coatings, laminations, or a combination thereof over all or a portion of the heating element, the connections, or both.

It is possible that the substrate and the electrical connections are encapsulated with a liquid impermeable layer. For example, at least a portion, or even substantially the entirety of the heating element may be laminated, coated or otherwise covered with a liquid impermeable layer. By way of example, an adhesive tape patch may seal the electrical connection to the substrate. The patch optionally may be a liquid impermeable material. Preferably, the substrate and the electrical connections are free of a liquid impermeable layer that extends over the heater, the connections, the substrate, the wire, or a combination thereof. The one or more patches may cover the one or more electrical connections, one or more sheaths, or both and connect the one or more sheaths to the flexible substrates. The one or more patches may function to protect the one or more sheaths from being damages. The one or more patches may function to prevent the one or more sheaths from being removed from the one or more electrical connections. The substrate, the patches, or both may be a fleece, a nonwoven material, a woven material, a non-fluid absorbing material, or a combination thereof. The substrate may be a nylon fleece, a PCC fleece, or both. The substrate may have a random fiber distribution, may be extruded, or a combination thereof. The heater, all of the components of the heater, all of the materials of the heater, or a combination thereof are substantially impermeable to liquid absorption. The components of the heater, the materials of the heater, or both may not absorb liquids, may not hold liquids, may not react with liquids, may not change when contact with a fluid, or a combination thereof. For example, if water is poured on the heater the materials of the heater such as the substrate or fleece layer will repel the water so that the water runs off, of the heater and is not retained by the heater.

The teachings herein also contemplate a method of making a heating element including steps of attaching the spacer to one or more wires and positioning the spacer in the proper location, forming a connection between the two or more wires, placing the heat shrinkable sheath with the mass of hot melt adhesive within the sheath on an electrical connection of at least two wires and heating the heat shrinkable sheath (e.g., to a temperature in excess of about 110° C. or even in excess of about 120° C.) with the mass of hot melt adhesive so that the sheath shrinks around the electrical connection and causes the hot melt adhesive to flow around (and optionally at least partially infiltrate the electrical connection) and encapsulate the electrical connection, wherein upon cooling to room temperature the electrical connection is liquid resistant. One or more spacers may be connected to a first wire and a second wire simultaneously, in series, or both. The one or more spacers may be installed on one or more of the two or more wires at the same time the wires are inserted within a sheath. The two or more wires may be crimped together, twisted together, or both to form the electrical connection. The crimping, twisting, or both of the two or more wires may be performed while the spacers are being applied to the wires, after the spacers are applied, or both. The spacers may assist in forming the electrical connections. The placing step may include providing a dual layer body including a heat shrinkable outer layer that shrinks in response to an application of heat and an inner layer that includes a hot melt adhesive that flows in response to the application of heat. The one or more sheaths may be shrunk before or after the wires are connected to the flexible substrate, a patch is applied, the heating element is created, or a combination thereof. As appreciated from the above, the method may include adhesively securing the at least two wires to the flexible substrate beneath an impermeable layer.

The shrinking waterproof tubes or shrinking tubes including any other insulating entities or materials such as like hot melts or curing polymer sealants (e.g., silicones or any other elastomers) may be applied over exposed and non-electrically insulated electrical heater connections or over connections of heater electrical circuit components (e.g., temperature regulators and thermostats). The shrinking waterproof tubes and/or shrinking tubes are applied to the non-electrically insulated circuit components so that a full and complete electrical circuit is formed and all of the heater electrically non-insulated components are insulated with respect to the surrounding elements and environment (e.g., a liquid like water, salty water; spilled liquids like coffee, tea, soda; solid materials (e.g., exposed wires, electrically conductive car components such as a car body, other components that may affect electrically performance and/or safety of the heater, or a combination thereof); or a combination thereof).

Figure 1A:
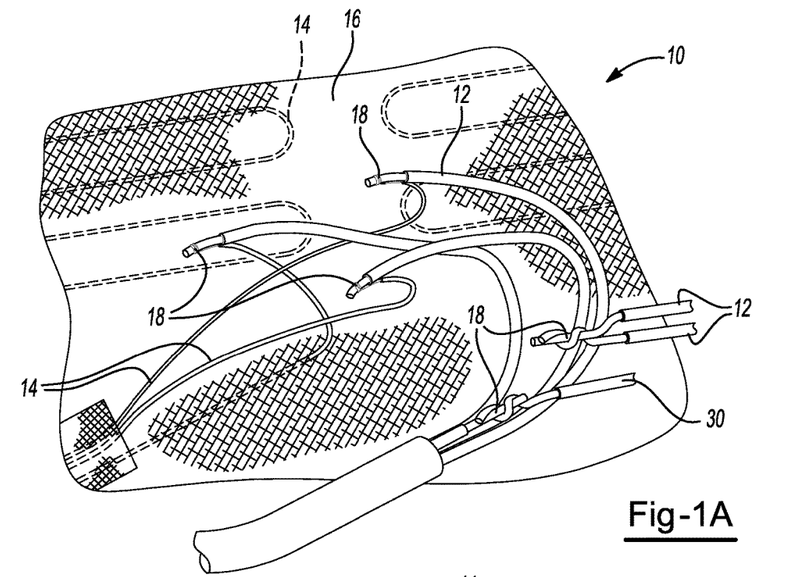
FIG. 1a illustrates wire connections before encapsulation with a multi-component shrink tube in accordance with the present teachings.
Figure 1B:
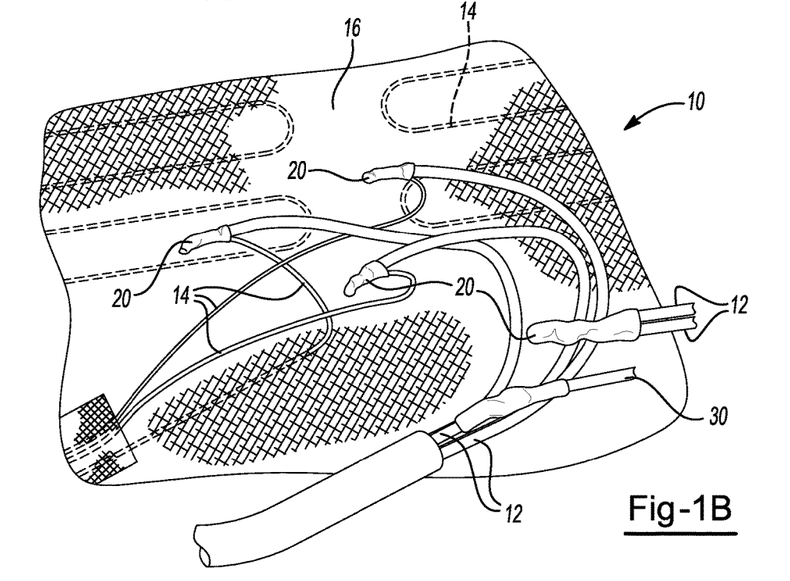
FIG. 1b illustrates wire connections after encapsulation with a multi-component shrink tube in accordance with the present teachings.

With reference to the accompanying FIGS. 1a-7, to further illustrate the teachings, a heating element 10 is depicted. FIG. 1 illustrates a heating element 10 having a plurality of harness wires 12, including a resistive heating wire 14 on a flexible substrate 16 (e.g., a textile substrate, such as a fleece). Electrical connections 18 connect two or more wires such as a harness wire 12 to a resistive heating wire 14. A temperature sensor 30 includes two wires 12 that are connected to opposing wires 12 so that a circuit is completed.

FIG. 1B illustrates a heat shrunken sheath 20 with a hot melt adhesive (not shown) within it that surrounds the electrical connections and protects them from liquids. The sheath 20 surrounds both the harness wires 12 and the resistive heating wires 14 and the connections formed therebetween. The sheath 20 also forms a connection between two harness wires 12 that connect a temperature sensor 30. The resistive heating wires 13 are connected to the flexible substrate 16 and form the heating element 10.

Figure 2:
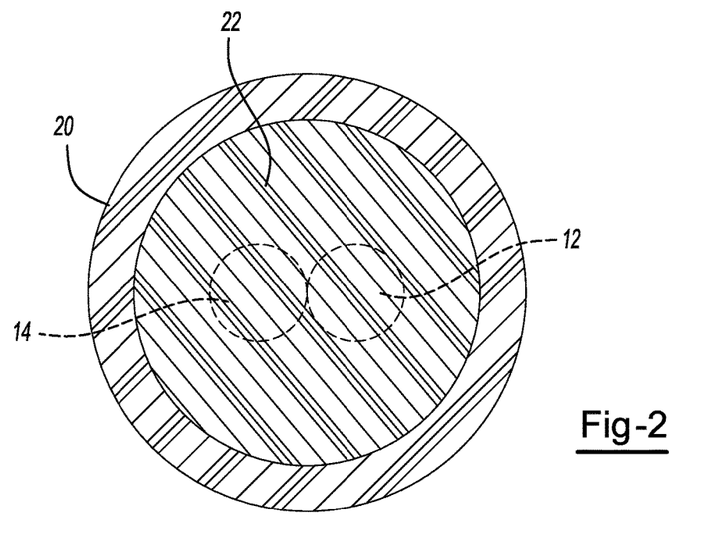
FIG. 2 illustrates an example of a multi-component shrink tube in accordance with the present teachings in which the internal volume is filled with a hot melt adhesive thereby encapsulating the electrical connection.

FIG. 2 illustrates a cross sectional view of a sheath 20 filled with hot melt adhesive 22 that encapsulates a harness wire 12 and a resistive heating wire 14.

Figure 3:
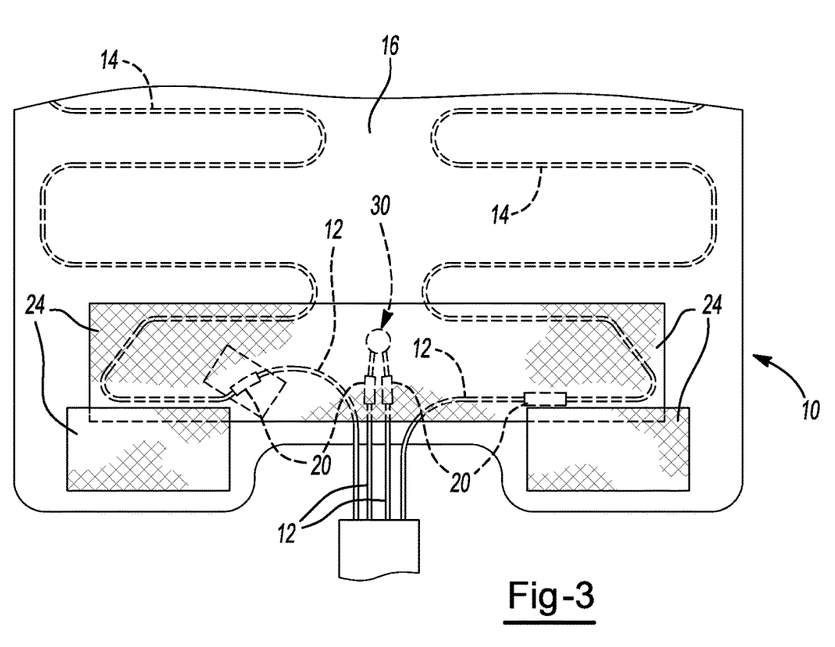
FIG. 3 illustrates an example of how sealed connections may be secured to a flexible substrate.

FIG. 3 illustrates a patch 24 adhesively bonded to overlie the encapsulated electrical connections and sheath 20, and further protect them from liquids. The patch 24 is connected to the flexible substrate 16 and sandwiches the harness wires 12, resistive heating wires 14, and temperature sensor 30 therebetween.

Figure 4:
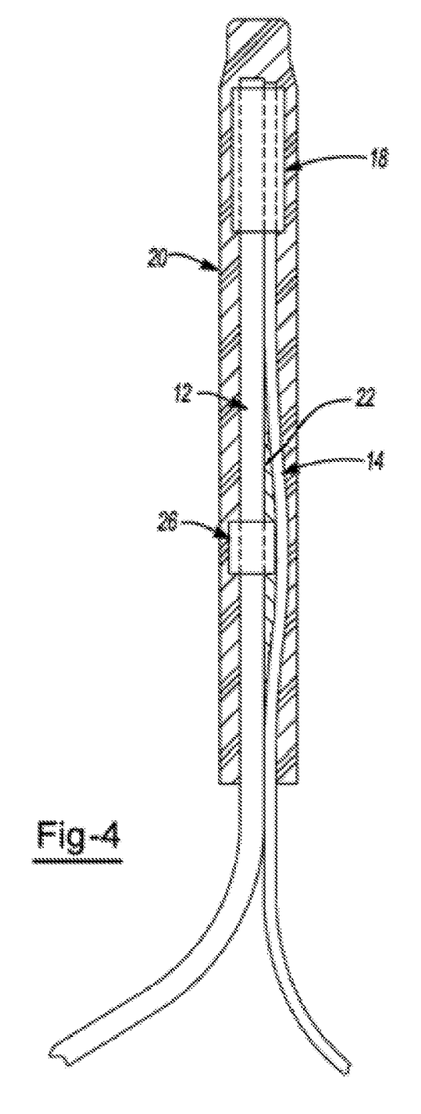
FIG. 4 illustrates an example of wire connections and a spacer to separate the wires when the wires are encapsulated with a multi-component shrink tube in accordance with the present teachings.

FIG. 4 illustrates a sheath 20 connecting a harness wire 12 to a resistive heating wire 14. The electrical connection 18 connects the harness wire 12 and resistive heating wire 14 both electrically and physically and a spacer 26 is attached to one of the wires, forming a space between the harness wire 12 and the resistive heating wire 14. The heat shrunken sheath 20 with an adhesive 22 surrounds the electrical connections and the harness wire 12 and resistive heating wire 14 and protects them from liquids.

Figure 5:
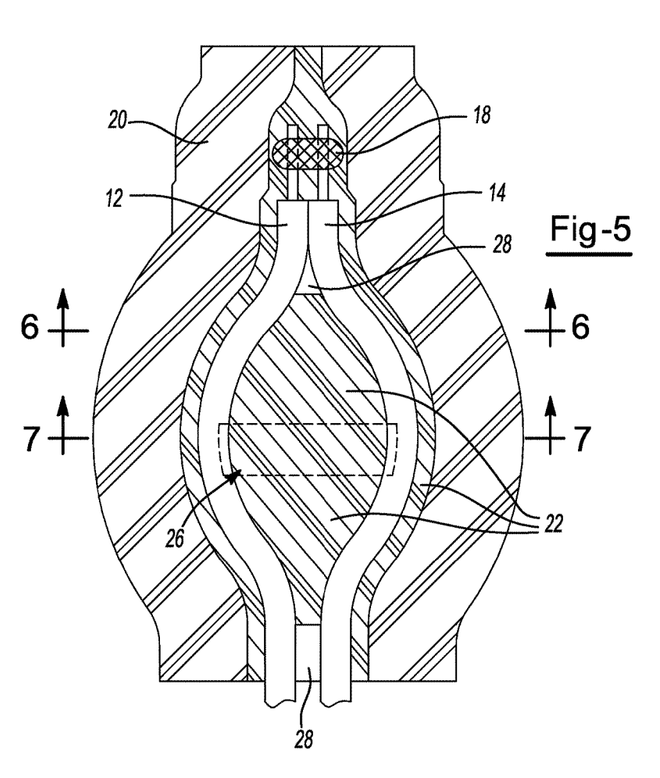
FIG. 5 illustrates wire connections and an exemplary spacer after encapsulation with a multi-component shrink tube in accordance with the present teachings.
Figure 6:
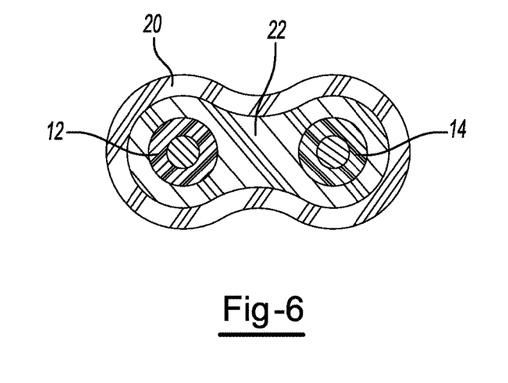
FIG. 6 illustrates the exemplary wires and a multi-component shrink tube along line 6-6 of FIG. 5 in which the internal volume is filled with a hot melt adhesive thereby encapsulating the wires.
Figure 7:
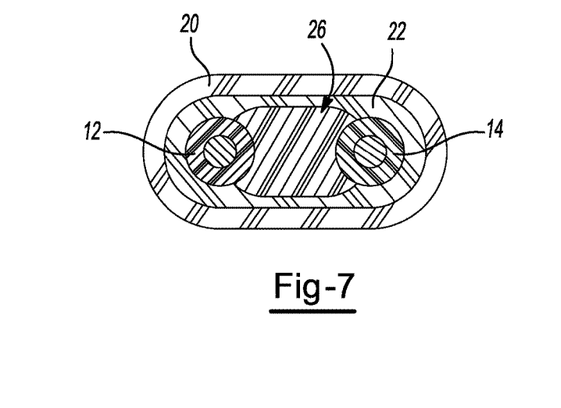
FIG. 7 illustrates the exemplary wires, spacer and multi-component shrink tube along line 7-7 of FIG. 5.

FIGS. 5-7 further illustrate the sheath 20 and electrical connections 18. As is shown in FIG. 5 an electrical connection 18 connects the harness wire 12 to a resistive heating wire 14. The heat shrunken sheath 20 with an adhesive 22 within it surrounds the electrical connection 18, the harness wire 12, and resistive heating wire 14. A spacer 26 is located between the harness wire 12 and resistive heating wire 14 (although the spacer may be located between other wires) and creates a gap therebetween to allow for the adhesive 22 to surround the wires while minimizing voids 28 where the wires are not contacted by adhesive 22. As shown a void 28 exists towards an entrance of the sheath 20 and a void 28 exists towards the electrical connections 18.

FIG. 6 illustrates a cut taken along line 6-6 of FIG. 5 to show the harness wire 12 and resistive heating wire 14 being individually encapsulated by the adhesive 22 within the heat shrunken sheath 20 as a result of the spacer 26 (see FIG. 5) providing adequate space between the harness wire 12 and resistive heating wire 14 to allow the adhesive 22 to flow between the harness wire 12 and resistive heating wire 14.

FIG. 7 illustrates a cut taken along line 7-7 of FIG. 5 to show the presence of the spacer 26 providing space between the wires 12, and adhesive 22 around an outside of the harness wire 12 and resistive heating wire 14.

EXAMPLES

Samples prepared in accordance with the present teachings exhibit no current leakage when submerged in water and subjected to a voltage of 13.5 volts and a steady current of 2.9 to 3.0 amperes (A). Current leakage, if any, would be detectable by a lead of an Amp meter (i.e., preferably a milliamp meter to measure even slight amounts of current) being inserted into the water. The data in the following Table 1 illustrate results expected from water submersion testing over a prolonged period of time.

TABLE 1

| (hrs.) | Sample 1 | Sample 2 | Sample 3 | Sample 4 |
| --- | --- | --- | --- | --- |
| Time no power submersed | 119 | 89 | 66 | 44 |
| Time energized submersed | 72 | 60 | 45 | 23 |
| Total time under water | 191 | 149 | 111 | 67 |

As used herein, unless otherwise stated, the teachings envision that any member of a genus (list) may be excluded from the genus; and/or any member of a Markush grouping may be excluded from the grouping.

Unless otherwise stated, any numerical values recited herein include all values from the lower value to the upper value in increments of one unit provided that there is a separation of at least 2 units between any lower value and any higher value. As an example, if it is stated that the amount of a component, a property, or a value of a process variable such as, for example, temperature, pressure, time and the like is, for example, from 1 to 90, preferably from 20 to 80, more preferably from 30 to 70, it is intended that intermediate range values such as (for example, 15 to 85, 22 to 68, 43 to 51, 30 to 32 etc.) are within the teachings of this specification. Likewise, individual intermediate values are also within the present teachings. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of to describe a combination shall include the elements, ingredients, components or steps identified, and such other elements ingredients, components or steps that do not materially affect the basic and novel characteristics of the combination. The use of the terms "comprising" or including" to describe combinations of elements, ingredients, components or steps herein also contemplates embodiments that consist of, or consist essentially of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

What is claimed is:

1. A heating element, comprising:
  i. at least two wires, one of the at least two wires is an electrically insulated resistive heating wire;
  ii. a flexible substrate that supports the electrically insulated resistive wire;
  iii. one or more electrical connections that join the at least two wires together,
  iv. a hollow cylindrical spacer that is received on one or more of the at least two wires via an opening in the hollow cylindrical spacer that receives and surrounds at least a portion of the one or more of the at least two wires, the hollow cylindrical spacer controlling spacing between the at least two wires by forming a gap between the at least two wires;
  v. a heat shrinkable sheath that includes at least one mass of hot melt adhesive within the heat shrinkable sheath; wherein a first wire of the at least two wires is passed through the opening of the hollow cylindrical spacer, the opening has a diameter about equal to an outer diameter of the first wire, and a second wire of the at least two wires is spaced away from the first wire by an outer diameter of the hollow cylindrical spacer; and
  wherein the at least two wires and the hollow cylindrical spacer are fully encapsulated in the heat shrinkable sheath and the at least one mass of hot melt adhesive when the heat shrinkable sheath is shrunken so that all portions of the hollow spacer are encapsulated and the one or more electrical connections are insulated from fluid penetration, and the at least one mass of hot melt adhesive extends into the gap between the at least two wires so that the at least one mass of hot melt adhesive fully encapsulates each of the at least two wires independently, eliminating voids in the at least one mass of hot melt adhesive between the at least two wires.

2. The heating element of claim 1, wherein the heating element is a seat heater or a steering wheel heater for an automotive vehicle.

3. The heating element of claim 1, wherein the at least two wires are selected from the one or more electrically insulated resistive heating wires and one or more power source wires, one or more negative thermal coefficient terminals, one or more sensor wires, one or more thermostat terminals, one or more control wires, one or more thermostat terminals, one or more power wires, a negative temperature coefficient sensor, a signal wire, a thermostat wire, a signal wire, or any combination thereof.

4. The heating element of claim 1, wherein the hot melt adhesive is characterized as having a melting or softening temperature in excess of about 45° C.

5. The heating element of claim 1, wherein the sheath is made from a material selected from a polyolefin, a neoprene, a polytetrafluoroethylene, or any combination thereof.

6. The heating element of claim 1, wherein an adhesive tape patch seals the electrical connection to the substrate.

7. The heating element of claim 1, wherein the at least two wires are insulated substantially along their length and exposed at the electrical connection where they are joined together.

8. The heating element of claim 1, wherein the one or more electrical connections are a plurality of electrical connections and at least one of the plurality of electrical connections is a connection between the one or more electrically insulated resistive heating wires and one or more power source wires, and a second of the plurality of electrical connections is a connection between one or more sensor wires and the one or more power source wires.

9. The heating element of claim 1, wherein the hollow cylindrical spacer is heat flowable.

10. The heating element of claim 1, wherein the hollow cylindrical spacer is expandable.

11. The heating element of claim 1, wherein the hollow cylindrical spacer is made of a same material as the hot melt adhesive.

12. The heating element of claim 1, wherein the hollow cylindrical spacer is elastomeric and non-rigid.

13. The heating element of claim 4, wherein the hollow cylindrical spacer has a glass transition temperature that is higher than the melting temperature of the hot melt adhesive, and the hollow cylindrical spacer does not melt or deform due to exposure to the hot melt adhesive.

14. The heating element of claim 1, wherein the hollow cylindrical spacer is configured to be attached to one or more of the at least at least two wires before, after, or during formation of the one or more electrical connections.

* * * * *